United States Patent [19]

Foate

[11] Patent Number: 4,998,348

[45] Date of Patent: Mar. 12, 1991

[54] TODDLER MEAL PROCESSOR

[76] Inventor: Richard A. Foate, 4514 Hanover Ave., Richmond, Va. 23221

[21] Appl. No.: 522,132

[22] Filed: May 11, 1990

[51] Int. Cl.⁵ .................. A21C 5/08; B26B 3/00; B26B 3/04

[52] U.S. Cl. ........................... 30/114; 30/303; 30/305

[58] Field of Search ............ 30/113.1, 114, 117, 30/302, 303, 304, 305

[56] References Cited

U.S. PATENT DOCUMENTS

| | | | |
|---|---|---|---|
| D. 116,273 | 8/1939 | Moore | 30/303 |
| 2,403,190 | 7/1946 | Parraga | 30/303 |
| 2,661,535 | 12/1953 | Berles | 30/305 |
| 4,195,402 | 4/1980 | Leffer | 30/114 |
| 4,580,343 | 4/1986 | Bell, Jr. | 30/114 |

Primary Examiner—Douglas D. Watts
Assistant Examiner—Paul M. Heyrana, Sr.
Attorney, Agent, or Firm—Staas & Halsey

[57] ABSTRACT

A cutting implement and method for subdividing sandwiches such as hamburgers into pieces that a toddler or small child can handle. The food processor includes a circular frame approximately two inches in height which is attached to five equally spaced parallel cutting blades which are also approximately two inches in height; two opposed upwardly and outwardly disposed handles are used simultaneously to cut a sandwich such as a hamburger into strips of approximately one inch in width. The cutting may be done on a piece of cardboard of the same approximate size or slightly larger than the food being cut so that the food is held together during the withdrawal of the food processing cutting implement and during the process of serving the cut up food. During the cutting action the cardboard cutting board is not cut through although the surface may be indented by the cutting blades.

17 Claims, 1 Drawing Sheet

TODDLER MEAL PROCESSOR

The present invention relates to a cutting implement for preparing food for toddlers and other small children.

Once children reach an age where they are away from strained fruits and meats and are actually starting to eat sandwiches and more solid food, the parent or other food preparer has to cut the food, whatever it may be, into small enough pieces that the toddler or small child can handle it. In the restaurant situation, especially fast food establishments, many parents of children who are at the toddler age which is usually between one and three will break up the sandwiches, hamburgers and the like with their hands. This involves unwrapping the sandwich, hamburger or the like first and then breaking it up into little pieces and then wiping the mustard and ketchup from their fingers.

The present invention is a simple to use implement that will allow the parent or another person with a single vertically downward pressure motion to cut the sandwich, hamburger or the like into strips approximately one inch wide. Then, if desired, cut the strips into squares approximately one inch on a side by turning the implement 90° and placing downward pressure again. Since this is approximately the height of many sandwiches, hamburgers and the like the resulting food size is approximate one inch cubes.

A search of prior patents has indicated a number of patents that are able to cut using parallel blades, however, none have been specifically designed to accomplish the results of the present invention nor could they accomplish the same results in as simple and satisfactory manner.

In summary, the present invention allows a parent or other person to position a circular, stainless steel assembly directly over the prepared food such as a hamburger, sandwich, pancake or the like and with two handles force a plurality of parallel cutting blades vertically downward with a pressing force to slice the food into strips of approximately one inch in width. If desired, the assembly may be then rotated 90° and pressed vertically downward again to make a second cut which produces squares of approximately one inch. As used herein, "sandwich" is used in its broadest meaning which is two or more slices of bread with a filling such as meat or cheese placed between them. A hamburger, cheeseburger and similar products are sandwiches.

It is important that the handles of the implement be positioned so that sufficient force can be applied in a single motion to vertically cut through the food to make the strips. It is also important that the height of the blades and the circular frame surrounding the blades be such that they are at least equal to the height of the food being cut so that when the implement is withdrawn from the cutting action the slices are not pulled apart. It is also important that the blades be substantially, completely surrounded by the circular frame and extend out the bottom thereof only a slight distance for safety and strength purposes. Preferably the blades, which are substantially straight, are removable from the frame for replacement, sharpening or cleaning. The entire implement is made from materials that are readily cleaned either by hand or in a dishwasher with stainless steel being the main material of the implement, however, the handles may be made of wood or plastic. The above features, as well as others, will become more apparent to those skilled in the art upon reading the following detailed description when taken in conjunction with the drawings wherein there is shown and described an illustrative preferred embodiment of the invention.

BRIEF DESCRIPTION OF THE DRAWINGS

In the course of the following detailed description reference will be made to the attached drawing in which:

With reference to FIG. 1, the meal processor or cutting implement includes a circular frame 10 in which are mounted preferably five relatively straight cutting blades, 11 through 15. The longest blade, 13, spans the diameter of the circular frame 10 with the two shortest blades being 11 and 15 which are of equal length and the two intermediate blades 12 and 14 which are of equal length. The spacing between the five parallel blades is equal and is preferably approximately one inch so that if a food item is being cut that is approximately six inches in diameter it will be cut into six strips of approximately one inch in width. Preferably the diameter of the circular frame 10 is approximately six inches as that accommodates a sandwich made from a standard slice of bread as well as most hamburgers and similar food items.

As seen in FIG. 1 and 2 each side of the circular frame 10 has attached thereto a handle support bracket 16 which support handles or handle assemblies 17. The handle support brackets include ferrules 18 at the end thereof. The handle support brackets have a middle section of arcuate shape 19. The arc is the same as the mating part of the circular frame to which it is attached either by spot welds, riveting, seam welds or the like. On each side of the middle or arcuate section 19 of the handle support bracket are two opposed upwardly extending tapered sections 20 which culminates in a ferrule 18 either integral therewith or welded thereto. The handle support bracket has a bottom edge 21 at the middle or arcuate section which lies in the same plane as the bottom edge 10 B of the circular frame 10. The arcuate section 19 also has a top edge 22 which is slightly below the top edge 10 A of the circular frame 10. The upward extending tapered section 20 is at an approximate 45° angle to the horizontal plane and tapers from the height of the arcuate section 19 to the approximate diameter of the ferrule 18 and as seen best from FIG. 1 lies in a flat vertical plane. Thus, when a downward force is applied to both handles 17 it is transmitted down the upwardly extended tapered sections and results as a downward force to the circular frame which carries the cutting blades with the force being applied to the circular frame inboard of the handle.

The circular frame, in addition to being approximately six inches in diameter, is approximately two inches in height and the bottom edge 10 B lies in a horizontal plane and the top edge 10 A lies in a horizontal plane parallel to the plane of the bottom edge.

Figure 3:
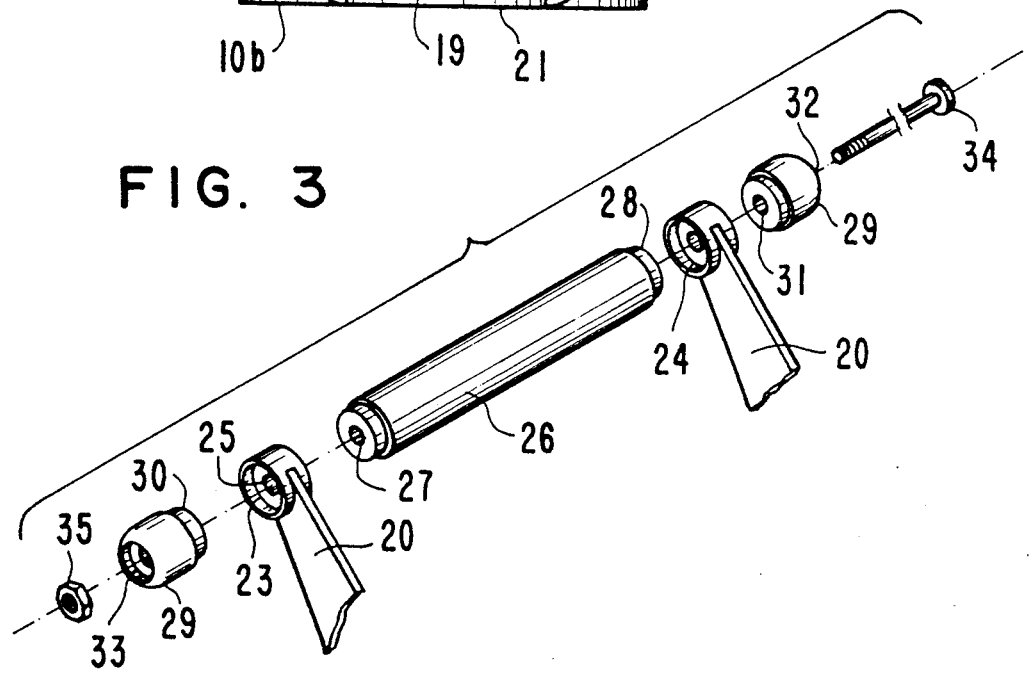
FIG. 3 is an exploded view of details of the handle assembly.

With reference to FIG. 3 there is shown an exploded view of the handle assembly together with the ends 20 of the handle support bracket 16. Each of the ferrules 18 have a ferrule outer recess 23 and a ferrule inner recess 24. These recesses are designed to mate with and support the necked-down portion 28 of the main handle member 26 and the necked-down portion 30 of the handle end caps 29. Thus, the necked-down portions of the main handle member and end caps are socketed into the recesses in the ferrule.

Through the center of the ferrule is a bolt receiving hole 25 which is just large enough to accommodate the outer dimensions of the shank of elongated bolt 34. The main handle member 26 likewise has a hole 27 extending through its entire length to accommodate the shank of the bolt 34 with just sufficient clearance to be inserted therein. The bolt 34 has a head at one end of its shank and a threaded portion at the other end. The head may be slotted to accommodate a screwdriver or be shaped to accommodate a socket wrench or the like. The handle end caps are primarily for decorative purposes and are rounded at the outer end with a recess on one cap to receive the bolt head and a recess on the other cap to receive the nut 35. The recess, especially for the nut, may be shaped of the same hexagonal configuration as the nut so that it is kept from turning as the bolt 34 is screwed therein.

When the handle is assembled and the bolt and nut fully tightened, the force applied to the main handle member 26 is transmitted to the shank of the bolt 34 and transmitted to the handle support bracket through the mating of the necked down portion 28 tightly fitted into the inner recesses 24 of the ferrule and also through the bolt shank inside the hole 25 of the ferrule. Thus, there is a strong connection between the downwardly transmitted forces on the handles to the cutting blades via the ferrules and handle support brackets which are attached to the circular frame 10.

The main handle members and end caps may be made of any suitable material but are preferably made of either wood or plastics. The other members are made of suitable non-rusting metal such as stainless steel.

Figure 1:
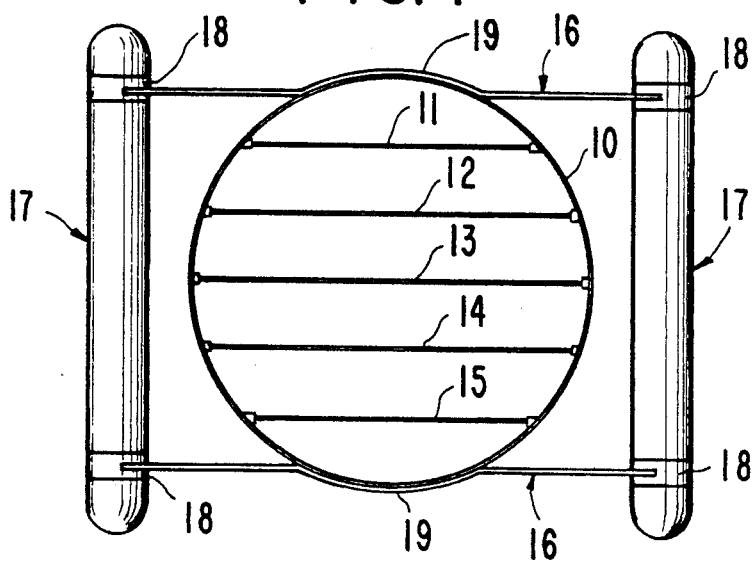
FIG. 1 is a plan view of the childrens meal processor.
Figure 4:
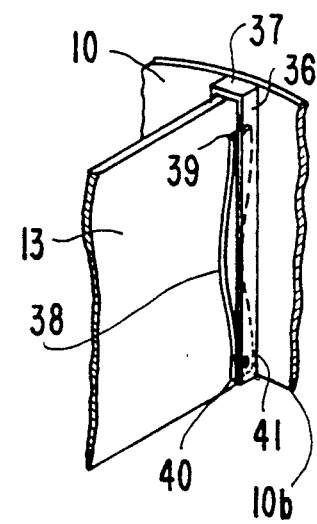
FIG. 4 is a broken away detailed prospective view of an arrangement for holding the cutting blades in the frame.
Figure 2:
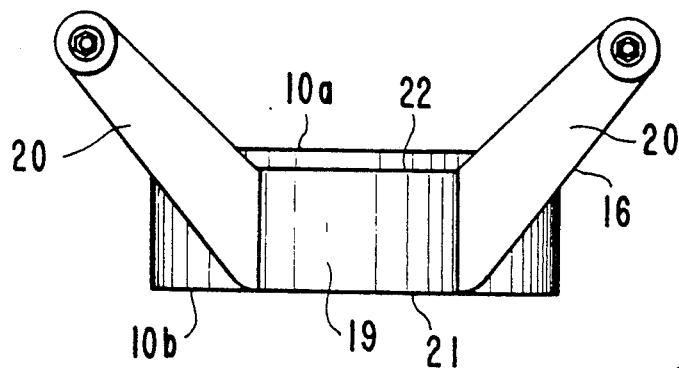
FIG. 2 is a side view of FIG. 1.

With reference to FIG. 4 there is shown one way of attaching the blades to the circular metal frame. While the blades could be welded to the circular metal frame preferably they are removable and one illustrative way of providing such a function is shown in FIG. 4 where the metal blade end 13 with a top flat surface and a bottom cutting edge is frictionally held in a blade holder 36 which is in a form of a small channel that is welded to the circular frame. This channel has its top end closed by top closure 37 and its bottom end open. The channel is slightly wider than the thickness of the blade 13 and the thickness of the friction leaf spring 38.

The friction leaf spring 38 has a top free end 39 and a bottom attached end 40. The bottom attached end is spot welded at 41 to the inside edge of the channel. The middle of the leaf spring has a bow which is flattened when the cutting blade 13 is inserted into the channel. By flattening the bow of the leaf spring a friction is applied to the side of the cutting blade as it is clamped between the pressed down leaf spring and the side of the inside of the channel to hold the blade in position by clamping friction once it is inserted.

The height of the blade is approximately two inches and is inserted to its fullest position until the top edge bottoms out on the top closure 37. In this position, the cutting lower edge extends to the lower edge 10 B of the circular frame and preferably slightly below such edge by a distance of approximately one-sixteenth of an inch. Thus, when the implement is used to cut a sandwich or the like the blade extends sufficiently to accommodate slight irregularities of the cutting board but at the same time the bulk of the cutting blades are protected by the circular frame. As the downward force is applied to the implement, the force actually applied to the cutting blades is to the top edges at the point of contact with the top closure 37. As the implement is withdrawn from the freshly cut sandwich and the like the strips are left in place and the friction of withdrawing on the blades is insufficient to overcome the frictional clamping of the blades into the frame.

It is to be noted that the bowed leaf spring 38 is shorter than the channel blade holder 36 with sufficient difference in length so that when the spring is flattened out and increases its length it still will not touch the top closure 37. Other ways of attaching the cutting blades to the circular frame would include a cast frame with cast grooves in place of the channels and other arrangements. Other arrangements could also be used so long as the blades can be accommodated in a manner that they will be held in place during the cutting action and subsequent withdrawal of the blades from the freshly cut food and yet be removable for replacement, cleaning or sharpening.

The invention has a primary use in fast food stores serving sandwiches, hamburgers and the like. When a customer requests that a sandwich or hamburger and the like be cut into slices or squares, the server will remove the sandwich or hamburger from its wrappings and on a cutting board vertically slice the food by pushing down on the two handles. This cuts the food into approximate one inch slices. If squares are desired the server will rotate either the cutting implement or food 90° and vertically press downward a second time to cut the food into the squares. Then the sandwich is rewrapped and served to the customer. In some cases, the food may be placed on a cardboard or foamed plastic disc of the same size or slightly larger than the food being cut which serves as a cutting board and stays with the cut up food to help hold it together when it is served.

Although a principal use for the cutting implement is in fast food restaurants, it also may be used as an implement in the home.

While the invention and its attendant advantages may be understood from the foregoing description, it will be apparent that various changes may be made in form and construction of the cutting implement used for food processing for children without departing from the spirit and scope of the invention or sacrificing all of its advantages. Thus, the form hereinabove described is primarily a preferred embodiment and that various changes may be made in the shape, size, materials and arrangement of parts without departing from the spirit of the invention as defined within the scope of the following claims.

WHAT IS CLAIMED IS:

1. A food processing implement for cutting food such as sandwiches into smaller pieces for easier biting by children comprising:

a circular frame of a diameter slightly larger than that necessary to encircle the standard sandwich having a height approximately equal to or higher than the food to be cut with said frame having a bottom edge lying in a horizontal plane;

a plurality of straight cutting blades parallel to one another and approximately equally spaced apart and attached at their ends to said circular frame with the height of said cutting blades approximately the height of said frame and the cutting edge of said blades lying in a horizontal plane slightly below or even with the plane of the bottom edge of said frame;

a plurality of handle support members mounted on the side of said circular frame and extending upward and outward therefrom and each handle support member having an outer end; and two handles above and outboard of said circular frame on opposite sides thereof attached to said handle support members outer end whereby both handles may be pressed vertically downward at the same time to cause said cutting blades to cut the food into strips of approximately the same blades to cut the food into strips of approximately the same width.

2. The food processing implement of claim 1 wherein said blades are removable for replacement, sharpening or cleaning.

3. The food processing implement of claim 2 wherein said circular frame has a plurality of channels having closed tops adapted to receive the ends of said blades.

4. The food processing implement of claim 3 wherein said channels include a means for holding said blades in said channels by friction.

5. The food processing implement of Claim 3 wherein said channels have two sides and include a bowed leaf spring attached at one side of said channel to be deflected by said end of said blades to provide a friction fit to hold said blades in place but permit their removability.

6. The food processing implement of claim 1 wherein: said handle support members include four upwardly and outwardly extending flat handle support members with two in a first vertical plane on one side of said circular frame and two in a second vertical plane parallel to said first plane on the opposite side of said circular frame;

a first arcuate section fastened to said frame connecting together said support members lying in said first plane; and a second arcuate section fastened to said circular frame and connecting together said support members lying in said second plane.

7. The food processing implement of claim 6 wherein:
a ferrule having an inner recess is attached to said outer end of all four handle support members;
a first main handle member socketed into said recesses between two opposing ferrules; and
a second main handle member socketed in said recesses of the remaining of two opposing ferrules.

8. The food processing implement of claim 7 wherein: said ferrules and said main handles have holes passing through the center thereof; and an elongated metal member is located in said holes.

9. The food processing implement of Claim 1 wherein said circular frame is approximately six inches in diameter and two inches in height and said cutting blades are five in number and are spaced approximately one inch apart.

10. The food processing implement of claim 9 wherein said cutting edges of said blades extend approximately one-sixteenth of an inch below said bottom edge of said circular frame.

11. The food processing implement of claim 10 wherein said handle support members extend upwardly at an angle of approximately 45°.

12. A method for preparing sandwiches and the like for children in fast food restaurants in sized pieces suitable for easy handling comprising the following steps:
preparing the sandwich or the like;
placing the sandwich or the like on a cutting surface;
cutting said sandwich or the like into slices approximately one inch in width by a single vertical downward pressing motion using a cutting implement having a surrounding frame sufficiently tall to at least equal the approximate height of said sandwich or the like and of outer dimensions at least as large as the sandwich or the like being cut with said frame containing five parallel vertical cutting blades having a height approximately equal to said surrounding frame by pressing downward on two handles located on opposite sides of said implement;
lifting and separating said cutting implement from said freshly cut sandwich or the like; and
serving said subdivided pieces of the sandwich or the like to the customer.

13. The method of claim 12 which includes the step of providing a said cutting surface made of cardboard or the like of approximately the same size or slightly larger as said sandwich or the like; and
handling said cut up pieces by using said cardboard or the like to help transfer the cut up pieces to the customer.

14. The method of claim 13 wherein said cutting blades protrude below said surrounding frame by approximately one-sixteenth of an inch.

15. The method of claim 12 wherein said cutting blades protrude below said surrounding frame by approximately one-sixteenth of an inch.

16. The method of claim 15 which includes the step of removing said cutting blades from said surrounding frame for replacement, sharpening or washing.

17. The method of claim 16 wherein said surrounding frame is circular and approximately six inches in diameter and two inches in height.

* * * * *